United States Patent
Chu et al.

(10) Patent No.: US 8,214,578 B2
(45) Date of Patent: Jul. 3, 2012

(54) METHOD OF STORING DATA INTO FLASH MEMORY ACCORDING TO USAGE PATTERNS OF ADDRESSES AND DATA STORAGE SYSTEM USING THE SAME

(75) Inventors: Chien-Hua Chu, Hsinchu County (TW); Shu-Hua Wang, Nantou County (TW)

(73) Assignee: Phison Electronics Corp., Miaoli (TW)

( * ) Notice: Subject to any disclaimer, the term of this patent is extended or adjusted under 35 U.S.C. 154(b) by 469 days.

(21) Appl. No.: 12/488,220

(22) Filed: Jun. 19, 2009

(65) Prior Publication Data
US 2010/0241789 A1    Sep. 23, 2010

(30) Foreign Application Priority Data
Mar. 20, 2009    (TW) .............................. 98109172 A

(51) Int. Cl.
*G06F 12/00* (2006.01)
*G06F 12/02* (2006.01)
(52) U.S. Cl. ................ 711/103; 711/105; 711/E12.001; 711/E12.008

(58) Field of Classification Search .................. 711/103, 711/105, E12.001, E12.008
See application file for complete search history.

(56) References Cited

U.S. PATENT DOCUMENTS
7,631,138 B2 * 12/2009 Gonzalez et al. ............. 711/103
* cited by examiner

*Primary Examiner* — Yong Choe
(74) *Attorney, Agent, or Firm* — J.C. Patents

(57) ABSTRACT

A data storage method for a flash memory storage device is provided. The method includes disposing a pattern identification unit in the flash memory storage device and disposing a pattern analysis unit in a host connected to the flash memory storage device. The method further includes analyzing a usage pattern of each flash memory storage address in the flash memory storage device by using the pattern analysis unit, receiving information from the pattern analysis unit through the pattern identification unit to identify the usage pattern of each flash memory storage address, and storing data into each flash memory storage address through a corresponding process according to the usage pattern of the flash memory storage address. Thereby, data can be stored according to the usage pattern of each flash memory storage address, and accordingly the speed of storing data into the flash memory storage device can be effectively increased.

25 Claims, 8 Drawing Sheets

METHOD OF STORING DATA INTO FLASH MEMORY ACCORDING TO USAGE PATTERNS OF ADDRESSES AND DATA STORAGE SYSTEM USING THE SAME

CROSS-REFERENCE TO RELATED APPLICATION

This application claims the priority benefit of Taiwan application serial no. 98109172, filed on Mar. 20, 2009. The entirety of the above-mentioned patent application is hereby incorporated by reference herein and made a part of this specification.

BACKGROUND

1. Technology Field

The present invention generally relates to a data storage method and a data storage system, and more particularly, to a data storage method for writing data into a flash memory and a data storage system using the same.

2. Description of Related Art

Along with the widespread of digital cameras, cell phones, and MP3 in recently years, the consumers' demand to storage media has increased drastically. Flash memory is one of the most adaptable memories for such battery-powered portable products due to its characteristics such as data non-volatility, low power consumption, small volume, and non-mechanical structure. A solid state drive (SSD) is a storage device which uses a NAND flash memory as its storage medium.

Generally speaking, a flash memory module in a flash memory storage device has a plurality of physical blocks, and a flash memory controller of the flash memory storage device logically groups these physical blocks into a system area, a data area, a spare area, and a replacement area. The physical blocks in the system area are used for storing information related to the flash memory storage device, and the physical blocks in the replacement area are used for replacing damaged physical blocks in the data area and the spare area. In a general access state, a host system (e.g. a computer) cannot access the physical blocks in the system area and the replacement area. The physical blocks in the data area are used for storing valid data written by write commands, and the physical blocks in the spare area are used for substituting the physical blocks in the data area when the write commands are executed. To be specific, when a flash memory storage device receives a write command from a host system for writing new data to update old data stored in a physical block to be updated in the data area, the control circuit of the flash memory storage device selects a physical block form the spare area, and writes the valid old data originally stored in the physical block to be updated in the data area and the new data into the physical block selected from the spare area. Then the flash memory storage device logically links the physical block containing the new data to the data area and erases the physical block to be updated in the data area and links it to the spare area. In order to allow the host system to successfully access the physical blocks which are alternatively used for storing data, the flash memory storage device provides logical blocks to the host system. Namely, the flash memory storage device reflects the alternation of the physical blocks by recording and updating the mapping relationship between the logical blocks and the physical blocks belonging to the data area in a logical address-physical address mapping table. Thus, the host system simply writes data into the provided logical block while the control circuit of the flash memory storage device accesses the corresponding physical block according to the logical address-physical address mapping table.

Based on the operation mechanism of flash memory storage device described above, if a computer system frequently writes and updates data in small quantities at a specific flash memory storage address, the flash memory storage device needs to execute foregoing data moving and erasing operations repeatedly. In particular, when a data of large quantity is to be moved, the access speed of the flash memory storage device will be greatly reduced. Besides, a physical block can only be erased for a limited number of times (for example, a physical block will be damaged after it is erased for 10,000 times). Accordingly, the lifespan of a flash memory storage device will be greatly shortened if the physical blocks therein are frequently erased.

However, a conventional flash memory storage device cannot identify the pattern that a computer system uses each flash memory storage address (for example, whether data in small quantities is repeatedly updated in a flash memory storage address). Thus, the conventional flash memory storage device cannot store data into a flash memory storage address according to different usage pattern thereof. As a result, the access speed of the flash memory storage device may be greatly reduced and the lifespan thereof may be shortened. Nothing, however, herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data storage method which can effectively increase the storage speed of a flash memory storage device and prolong the lifespan of the same.

The present invention is further directed to a data storage system having increased storage speed and prolonged lifespan.

According to an exemplary embodiment of the present invention, a data storage method is provided. The data storage method includes providing a storage device and a pattern analysis unit, wherein the storage device has a control circuit and a plurality of flash memory storage addresses, and the pattern analysis unit is controlled by a host. The data storage method also includes disposing a pattern identification unit in the control circuit. The data storage method further includes recording a usage pattern of each of the flash memory storage addresses by using the pattern analysis unit, receiving information from the pattern analysis unit through the pattern identification unit to identify the usage pattern of each of the flash memory storage addresses, and storing data into each of the flash memory storage addresses according to the usage pattern of the flash memory storage address.

According to an exemplary embodiment of the present invention, a data storage system including a host, a storage device, and a pattern analysis unit is provided. The storage device is coupled to the host, wherein the storage device has a control circuit and a plurality of flash memory storage addresses, and the control circuit has a pattern identification unit. The pattern analysis unit is controlled by the host to record a usage pattern of each of the flash memory storage addresses, wherein the pattern identification unit receives information from the pattern analysis unit and identifies the usage pattern of each of the flash memory storage addresses, and the control circuit stores data into each of the flash memory storage addresses according to the usage pattern of the flash memory storage address.

According to an exemplary embodiment of the present invention, a data arrangement method adapted to transfer data to a flash memory module having a plurality of flash memory storage addresses is provided. The data arrangement method includes providing a control circuit and disposing a pattern identification unit in the control circuit. The data arrangement method comprises also includes receiving information from a pattern analysis unit controlled by a host through the pattern identification unit to identify a usage patterns of the flash memory storage addresses recorded by the pattern analysis unit, and storing data into the flash memory storage addresses according to the usage pattern of the flash memory storage addresses.

According to an exemplary embodiment of the present invention, an apparatus adapted to transfer data to a detachable flash memory storage having a plurality of flash memory storage addresses is provided. The apparatus includes a processor and a pattern analysis unit. The pattern analysis unit, coupled to the processor, is used for recording a usage pattern of each of the flash memory storage addresses, wherein the pattern analysis unit records whether each of the logical blocks belongs to a frequent update pattern as the usage pattern of the logical block.

As described above, in exemplary embodiments of the present invention, data is stored through different process according to the usage pattern of each flash memory storage address and the pattern of the data. Accordingly, the storage speed of the storage system can be effectively increased and the lifespan of the storage system can be effectively prolonged. It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
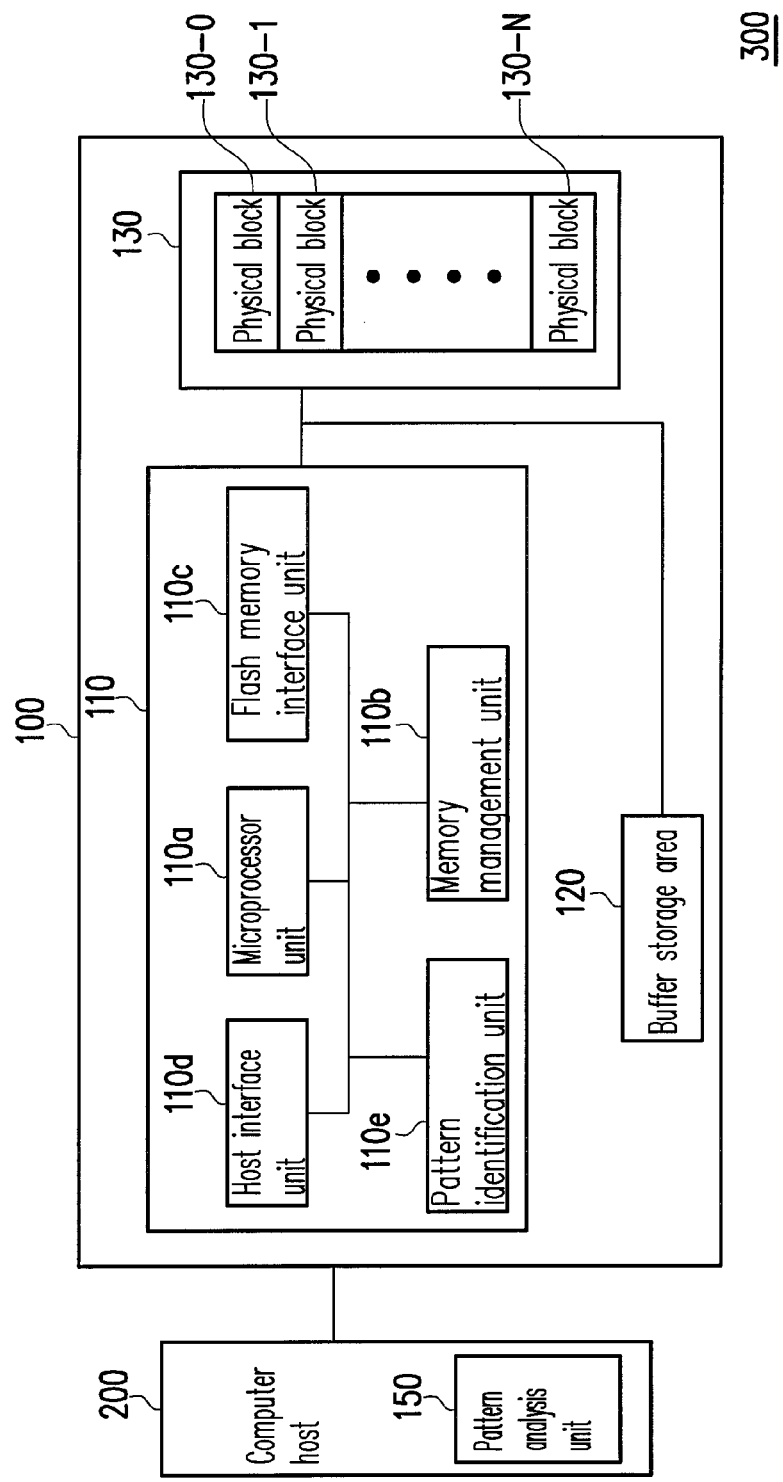
FIG. 1 illustrates a data storage system according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Certain terminology is used in the following description for convenience only and is not limiting. Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably, but that "consisting essentially of" denotes particular features only and thus is partially closed-ended.

In the data storage method provided by the exemplary embodiment of the present invention, a host executes a pattern analysis unit to record a usage pattern of each flash memory storage address and transmits the usage pattern to a control circuit in a storage device through a pattern identification unit disposed between the storage device and the host. After that, the control circuit of the storage device stores data according to the usage pattern of each flash memory storage address. Thereby, the access speed of the storage device is increased and the lifespan of the same is prolonged. Embodiments of the present invention will be described below with reference to accompanying drawings.

First Exemplary Embodiment

FIG. 1 illustrates a data storage system according to the first exemplary embodiment of the present invention.

Referring to FIG. 1, the data storage system 300 includes a flash memory storage device 100, a computer host 200, and a pattern analysis unit 150. The flash memory storage device 100 is connected to the computer host 200 so that the computer host 200 can write data into or read data from the flash memory storage device 100. In the present exemplary embodiment, the flash memory storage device 100 is a solid state drive (SSD). However, the flash memory storage device 100 may also be a memory card or a flash drive in another embodiment of the present invention. In addition, in the present exemplary embodiment, the pattern analysis unit 150 is implemented as software in the computer host 200. However, the pattern analysis unit 150 may also be implemented as hardware or firmware.

The flash memory storage device 100 includes a flash memory controller 110 and a flash memory 130.

The flash memory controller 110 executes a plurality of logic gates or control instructions implemented as hardware or firmware and accesses data in the flash memory 130 according to instructions of the computer host 200.

The flash memory controller 110 includes a microprocessor unit 110a, a memory management unit 110b, a flash memory interface unit 110c, a host interface unit 110d, and a pattern identification unit 110e.

The microprocessor unit 110a cooperates with the memory management unit 110b, the flash memory interface unit 110c, the host interface unit 110d, and the pattern identification unit 110e to carry out various operations of the flash memory storage device 100.

The memory management unit 110b is coupled to the microprocessor unit 110a and executes a block management mechanism and a data writing mechanism according to the present exemplary embodiment.

In the present embodiment, the memory management unit 110b is implemented in the flash memory controller 110 as a firmware. For example, the memory management unit 110b including a plurality of control instructions is burnt into a program memory (for example, a read only memory, ROM), and the program memory is embedded into the flash memory controller 110. When the flash memory storage device 100 is in operation, the control instructions of the memory management unit 110b are executed by the microprocessor unit 110a so that the block management mechanism and the data writing mechanism in the present embodiment can be performed.

In another embodiment of the present invention, the control instructions of the memory management unit 110b may also be stored in a specific area (for example, a system area of a flash memory for exclusively storing system data) of the flash memory 130 as software. Similarly, when the flash memory storage device 100 is in operation, the control instructions of the memory management unit 110b are executed by the microprocessor unit 110a. In yet another embodiment of the present invention, the memory management unit 110b may also be implemented in the flash memory controller 110 as hardware.

The flash memory interface unit 110c is coupled to the microprocessor unit 110a for accessing the flash memory 130. Namely, data to be written into the flash memory 130 is converted by the flash memory interface unit 110c into a format acceptable to the flash memory 130.

The host interface unit 110d is coupled to the microprocessor unit 110a for receiving and identifying instructions issued by the computer host 200. Namely, an instruction and data issued by the computer host 200 are transmitted to the microprocessor unit 110a through the host interface unit 110d. In the present exemplary embodiment, the host interface unit 110d is a SATA interface. However, the present invention is not limited thereto, the host interface unit 110d may also be a USB interface, an IEEE 1394 interface, a PCI Express interface, a MS interface, a MMC interface, a SD interface, a CF interface, an IDE interface, or other suitable data transmission interfaces.

The pattern identification unit 110e is coupled to the microprocessor unit 110a for receiving and identifying a usage pattern transmitted by the pattern analysis unit 150.

In addition, even though not shown in the present embodiment, the flash memory controller 110 may further include other general function modules for controlling the flash memory 130, such as a buffer memory, an error correcting unit, and a power management unit.

A buffer storage area 120 is coupled to the flash memory controller 110 for temporarily storing data to be written by the computer host 200. In the present exemplary embodiment, the buffer storage area 120 is a dynamic random access memory (DRAM). However, the present invention is not limited thereto, a static random access memory (SRAM), a magnetoresistive random access memory (MRAM), a phase change random access memory (PRAM), a single level cell (SLC) NAND flash memory, or other suitable memories may also be applied in the present invention. In particular, the buffer storage area 120 may also be composed of some physical blocks in the flash memory 130.

The flash memory 130 is coupled to the flash memory controller 110. The flash memory 130 includes a plurality of physical blocks 130-0~130-N for storing data. In the present embodiment, the flash memory 130 is a multi level cell (MLC) NAND flash memory. However, the present invention is not limited thereto, and the flash memory 130 may also be a SLC NAND flash memory in another embodiment of the present invention.

In the flash memory 130, data is erased in unit of physical blocks. Namely, each physical block contains the smallest number of memory cells which are erased together. Each physical block is usually divided into a plurality of pages (for example, 128 pages). Because in the present exemplary embodiment, the flash memory 130 is a MLC NAND flash memory, each page is the smallest programming unit. In other words, page is the smallest unit for reading and writing data. Each page is usually divided into a data area D and a redundant area R, wherein the data area D is used for storing general data, and the redundant area R is used for storing system data (for example, an error checking and correcting code, ECC code). In the present exemplary embodiment, each page in the flash memory 130 has 8 sectors. Generally speaking, a sector contains 512 bytes. Accordingly, each page in the flash memory 130 has 4 kilo bytes (KB).

It should be mentioned that the flash memory 130 is a MLC NAND flash memory such that each physical block in the flash memory 130 is programmed in multiple stages. Taking a 4 level memory cell as an example, each physical block is programmed in two stages. The first stage is to write data into the lower page addresses, wherein the physical characteristic of the lower pages is similar to that of a SLC storage unit. The upper pages are programmed in the second stage, and the write speed of the lower page addresses is faster than that of the upper page addresses. Accordingly, the page addresses of each physical block can be categorized into low-speed pages (i.e., the upper pages) and high-speed pages (i.e., the lower pages). Similarly, in an 8 level memory cell or a 16 level memory cell, the memory cell contains more page addresses and data is written in more stages. Herein, the page having the fastest write speed is referred to as the lower page, and all the other pages having slower write speeds are referred to as upper pages.

In addition, it should be noted that in other flash memory designs (for example, a SLC NAND flash memory), the smallest programming unit may also be sector, namely, data is programmed in unit of sectors. In another exemplary embodiment of the present invention, the physical blocks in the flash memory 130 may also be grouped into several zones. By managing the physical blocks in unit of zones, the parallelism of operations is increased and the management of the physical blocks is simplified.

Figure 2A:
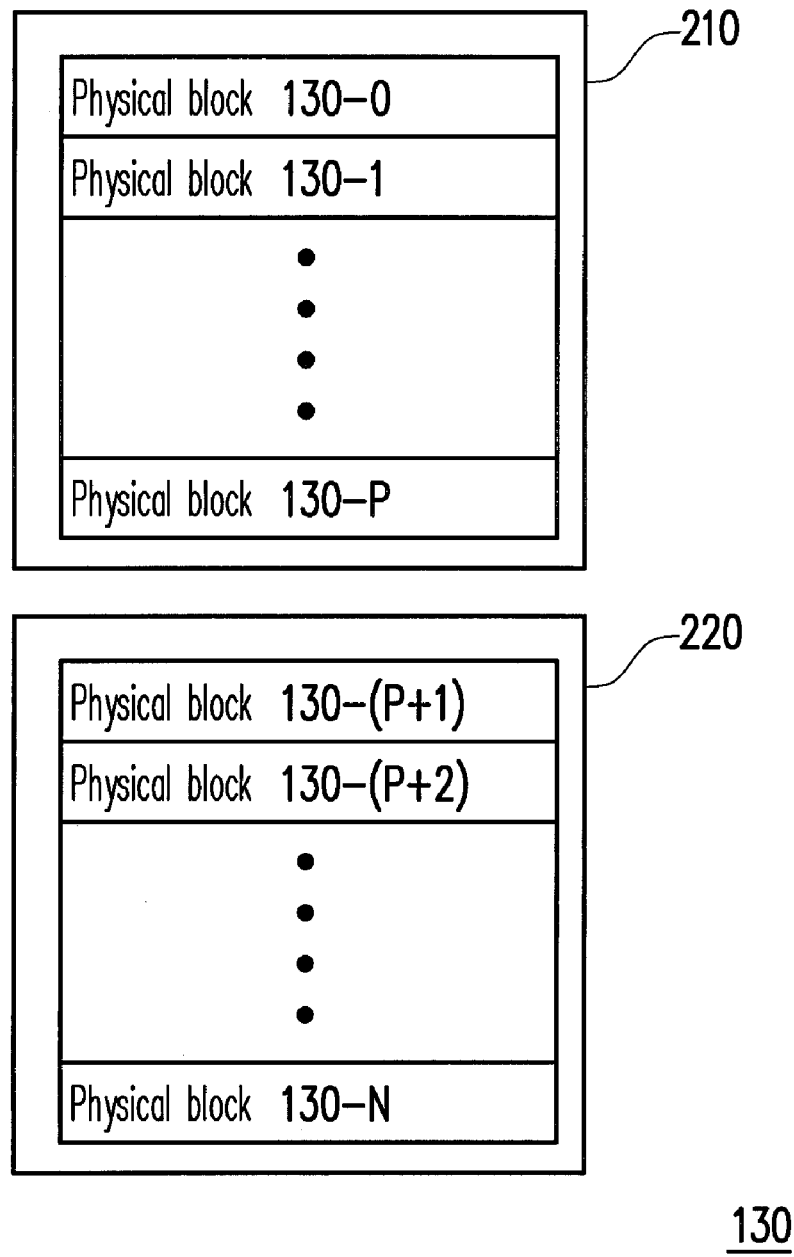
FIGS. 2A~2C are diagrams illustrating the operations of a flash memory according to the first exemplary embodiment of the present invention.
Figure 2B:
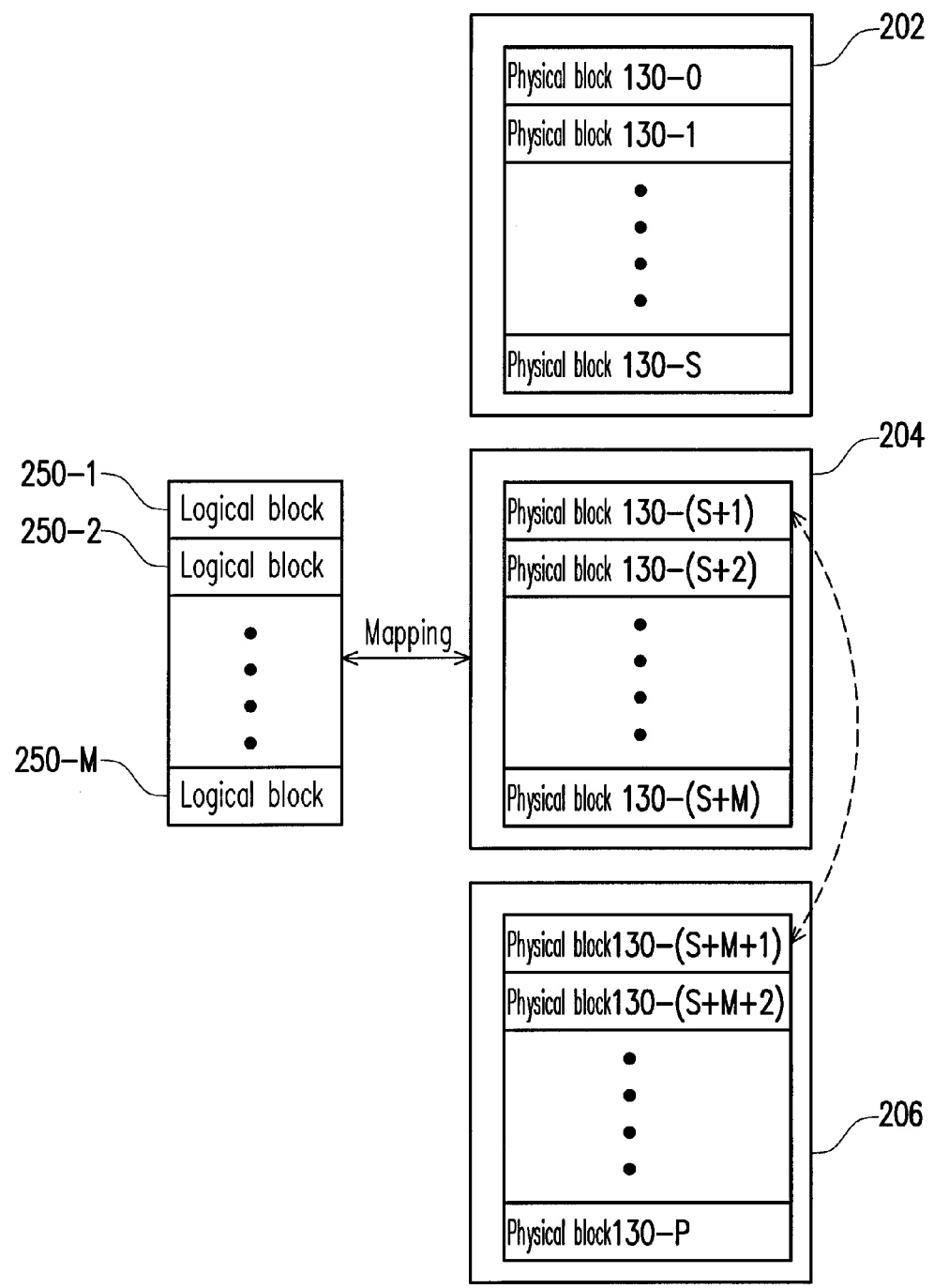
Figure 2C:
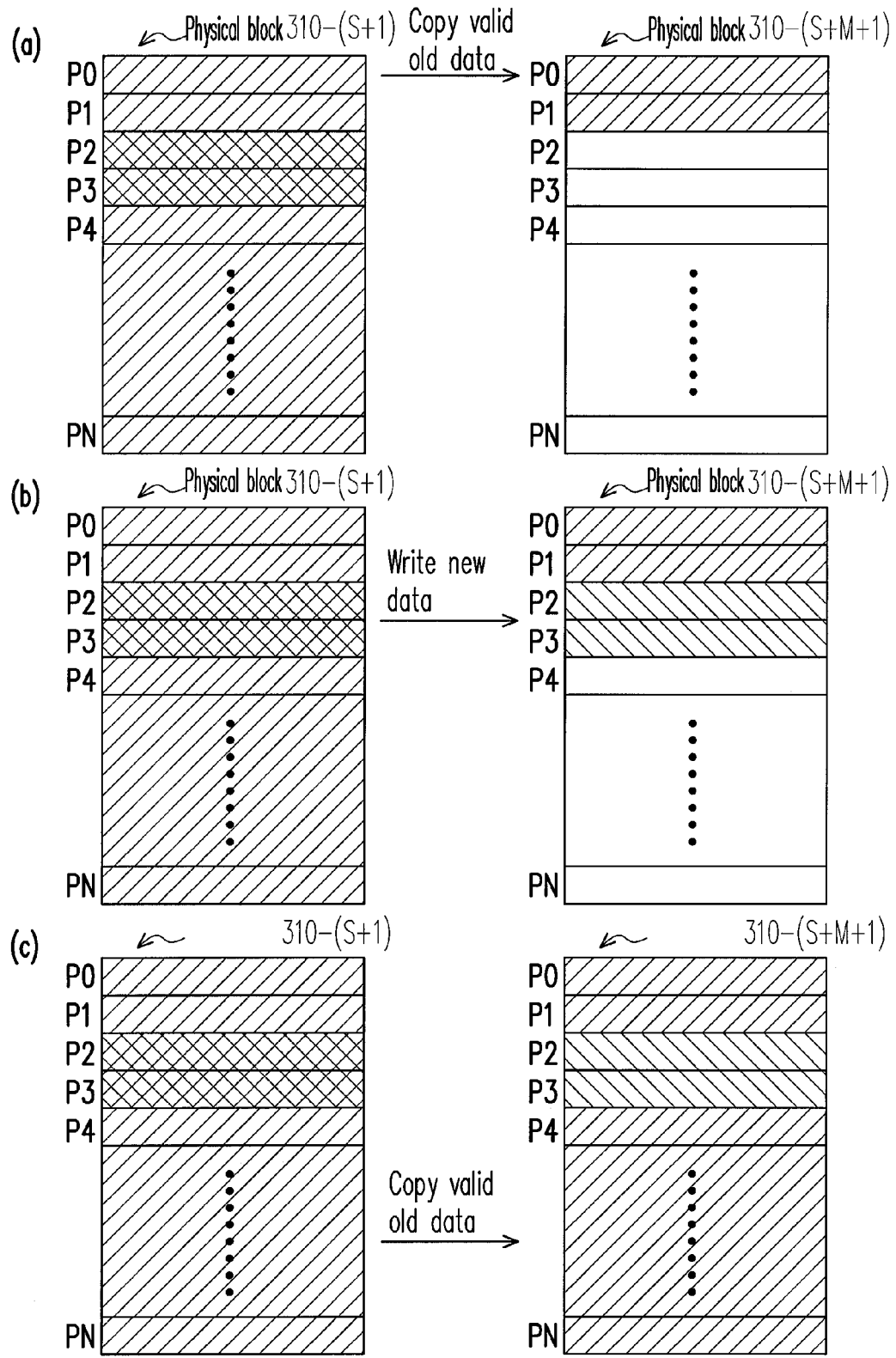

FIGS. 2A~2C are diagrams illustrating the operations of a flash memory according to the first exemplary embodiment of the present invention.

It should be understood that in following descriptions, the terms "select", "move", "replace", "substitute", "alternate", and "group" refer to logical operations performed to the physical blocks in the flash memory 130. Namely, the actual positions of the physical blocks in the flash memory 130 are not changed, and the physical blocks in the flash memory 130 are only operated logically. It should be mentioned that following operations are carried out by the flash memory controller 110.

Referring to FIG. 2A, the memory management unit 110b logically groups the physical blocks 130-0~130-N in the flash memory 130 into a storage area 210 and a replacement area 220.

The physical blocks 130-0~130-P in the storage area 210 are normally used in the flash memory storage device 100. Namely, the memory management unit 110b writes data into the physical blocks in the storage area 210.

The physical blocks 130-(P+1)~130-(N) in the replacement area 220 are replacement physical blocks. For example, when the flash memory 130 is manufactured, 4% of the physical blocks therein are reserved for replacement purpose. Namely, when a physical block in the storage area 210 is damaged, a physical block is selected from the replacement area 220 for replacing the damaged physical block (i.e., bad block). Thus, if there are still available physical blocks in the replacement area 220 and a physical block is damaged, the memory management unit 110b selects an available physical block from the replacement area 220 for replacing the damaged physical block. If there is no available physical block in the replacement area 220 and a physical block is damaged, the flash memory storage device 100 is announced to be inoperative.

Referring to FIG. 2B, the flash memory controller 110 logically groups the physical blocks in the storage area 210 into a system area 202, a data area 204, and a spare area 206.

The system area 202 contains physical blocks 130-(0)~130-(S), the data area 204 contains physical blocks 130-(S+1)~130-(S+M), and the spare area 206 contains physical blocks 130-(S+M+1)~130-(P). In the present embodiment, S, M, and P are positive integers smaller than or equal to N, and which respectively represent the number of physical blocks disposed in each area and can be determined by the manufacturer of the flash memory storage device according to the capacity of the flash memory module.

Physical blocks belonging to the system area 202 are used for recording system data, wherein the system data includes the manufacturer and model of the flash memory chip, the number of zones in each flash memory module, the number of physical blocks in each zone, and the number of pages in each physical block, etc.

Physical blocks belonging to the data area 204 are used for storing user data. Generally speaking, these physical blocks are mapped to the logical blocks which are accessed by the computer host 200. Namely, the physical blocks in the data area 204 are used for storing valid data.

Physical blocks belonging to the spare area 206 are used for substituting the physical blocks in the data area 204. Thus, physical blocks in the spare area 206 are blank or available blocks, namely, no data is recorded in these physical blocks or data recorded therein is marked as invalid data. In other words, physical blocks in the data area 204 and the spare area 206 are used alternatively by the computer host 200 for storing data into the flash memory storage device 100.

As described above, physical blocks in the flash memory 130 are alternatively provided to the computer host 200 for storing data. Thus, the logical blocks 250-1~250-M are provided to the computer host 200 to be used for accessing data, and the physical blocks mapped to these logical blocks are recorded in a logical address-physical address mapping table.

Referring to both FIG. 2B and FIG. 2C, for example, when the computer host 200 is about to write a data into the logical block 250-1, the flash memory controller 110 obtains that the logical block 250-1 is currently mapped to the physical block 130-(S+1) in the data area 204 through the logical address-physical address mapping table. Accordingly, the memory management unit 110b updates data in the physical block 130-(S+1), and meanwhile, the flash memory controller 110 selects the physical block 130-(S+M+1) from the spare area 206 for substituting the physical block 130-(S+1) in the data area 204. However, when the memory management unit 110b writes the new data into the physical block 130-(S+M+1), the memory management unit 110b does not move all the valid data originally stored in the physical block 130-(S+1) instantly to the physical block 130-(S+M+1) to erase the physical block 130-(S+1). To be specific, the flash memory controller 110 copies the valid data originally stored in the physical block 130-(S+1) before the page to be written (i.e., pages P0 and P1) into the physical block 130-(S+M+1) (as shown in FIG. 2C(a)), and writes the new data (i.e., the pages P2 and P3 in the physical block 130-(S+M+1)) into the physical block 130-(S+M+1) (as shown in FIG. 2C(b)). Herein, the flash memory controller 110 completes the writing operation. Because the valid data in the physical block 130-(S+1) may become invalid during a next operation (for example, a write command), it may be meaningless to move all the valid data in the physical block 130-(S+1) instantly to the substitute physical block 130-(S+M+1). In this example, the combined contents of the physical blocks 130-(S+1) and 130-(S+M+1) is the complete content of the corresponding logical block 250-1. The number of such transient mother-child relationship (i.e., the physical blocks 130-(S+1) and 130-(S+M+1)) is determined according to the capacity of a buffer memory (not shown) in the flash memory controller 110, and the operation for temporarily maintaining such a transient relationship is referred to as "opening" mother-child blocks.

Thereafter, only when the contents in the physical blocks 130-(S+1) and 130-(S+M+1) are to be really combined, the flash memory controller 110 integrates the physical block 130-(S+1) and the physical block 130-(S+M+1) into a single physical block, so that the efficiency of using these blocks can be improved. Such an integration action is also referred to as "closing" mother-child blocks. For example, as shown in FIG. 2C(c), while closing the mother-child blocks, the flash memory controller 110 copies the remaining valid data in the physical block 130-(S+1) (i.e., pages P4~PN) to the substitute physical block 130-(S+M+1), and then erases the physical block 130-(S+1) and links it to the spare area 206. Meanwhile, the flash memory controller 110 links the physical block 130-(S+M+1) to the data area 204 and updates the logical address-physical address mapping table to indicate that the logical block 250-1 is currently mapped to the physical block 130-(S+M+1).

In addition, because the programming specification of the flash memory 130 requires data to be written into each physical block from the first page to the last page, and each bit can only be programmed once (i.e., can only be changed from "1" to "0"), if a page address in the physical block already contains a data and the data is to be updated, a physical block has to be selected from the spare area 206 (as shown in FIG. 2B) and the steps illustrated in FIG. 2C have to be executed again. Accordingly, when the just moved data (for example, the pages P0 and P1 as shown in FIG. 2C(a)) has to be updated in the transient state as shown in FIG. 2C(b) before the closing operation as shown in FIG. 2C(c) is performed, the data which is already moved has to be moved again. In order to avoiding data is moved repeatedly, a random writing mode is performed in the present exemplary embodiment. To be specific, when the random writing mode is performed, the memory management unit 110b selects a physical block from the spare area 206 and directly writes the new data into this physical block without carrying out the steps illustrated in FIG. 2C(a), and when the random writing mode ends, the memory management unit 110b selects another physical block from the spare area 206 to write all the valid data. In other words, when the random writing mode is performed, data may be written directly without copying valid old data corresponding to the data first.

In the present exemplary embodiment, the pattern analysis unit 150 determines which logical blocks among the logical blocks 250-1~250-M are frequently written. In the present exemplary embodiment, the pattern analysis unit 150 determines whether the logical blocks 250-1~250-M contain such information as a file system table and directories, wherein the file system table includes file allocation table (FAT), NT file system (NTFS), or other file management system. Because the computer host 200 frequently updates the file system table and directory information, and the updated data usually has very small quantities (less than a page), the pattern analysis unit 150 identifies the logical blocks for storing such information as a frequent update pattern. For example, if the computer host 200 is a FAT system, after the computer host 200 is coupled to the flash memory storage device 100, the pattern analysis unit 150 first detects the data at the logical block address 0 (LBA) in the flash memory, wherein this LBA is predetermined as the logical address for storing the master boot record (MBR). A partition boot record (PBR) can be obtained according to the data stored in the MBR. Then, logical blocks for storing FAT1, FAT2, and the root directory can be found according to the PBR. Thus, the pattern analysis unit 150 can obtain the logical blocks for storing the file system table and the directories and identifies these logical blocks as the frequent update pattern. In addition, the pattern analysis unit 150 records the history of the computer host 200 writing to each of the logical blocks 250-1~250-M in a memory (not shown) of the computer host 200. To be specific, the pattern analysis unit 150 records the number of the computer host 200 writing data into each of the logical blocks 250-1~250-N and the quantity of data written each time. For example, if the writing history recorded in the memory shows that the writing number of a specific logical block is higher than a write number threshold (for example, an average value of the writing numbers of all the logical blocks), the pattern analysis unit 150 identifies the logical block as a frequent update pattern. Again, if the writing history shows that the number of writing big data (for example, data more than a page) into a specific logical block is more than the number of writing small data (for example, data less than a page) into the logical block, the pattern analysis unit 150 identifies the logical block as a continuous storage pattern. In another embodiment of the present invention, if the length of data to be written is more than a data quantity threshold, the pattern analysis unit 150 identifies the logical block as the continuous storage pattern.

Particularly, in the present exemplary embodiment, the pattern analysis unit 150 transmits the analyzed information (i.e., the usage pattern of each logical block) to the pattern identification unit 110e through a usage pattern update command, and the pattern identification unit 110e identifies the information and transmits the usage patterns to the memory management unit 110b. In the present exemplary embodiment, the pattern analysis unit 150 transmits the analyzed information to the flash memory storage device 100 through an usage pattern update command every time when the quantity of data written by the computer host 200 into the flash memory storage device 100 exceeds a predetermined data quantity or the number of write commands exceeds a predetermined number. It should be understood that foregoing predetermined data quantity and predetermined number can be determined by a user. In the present exemplary embodiment, the predetermined data quantity is 100 megabytes (MB), and the predetermined number is 100 times.

In another exemplary embodiment of the present invention, the usage pattern update command may also be indicated in each write command. Namely, every time when the computer host 200 is about to write data into the flash memory storage device 100, the pattern analysis unit 150 analyzes the logical address for writing the data. If the logical address belongs to the frequent update pattern or the continuous storage pattern, the pattern analysis unit 150 transmits the usage pattern update command corresponding to foregoing pattern to the flash memory storage device 100 before, after, or at the same time when transmitting the write command. After identifying the usage pattern update command, the pattern identification unit 110e transmits a message corresponding to the usage pattern update command to the microprocessor unit 110a. After the microprocessor unit 110a receives the message, the memory management unit 110b writes the data into the physical address corresponding to the message.

For example, if the pattern identification unit 110e identifies that the data belongs to the frequent update pattern, the memory management unit 110b writes the data into the buffer storage area 120; otherwise, the memory management unit 110b writes the data into the corresponding physical block.

In addition, in another exemplary embodiment of the present invention, if the pattern identification unit 110e identifies that the data belongs to the frequent update pattern, the memory management unit 110b may write the data into only the lower pages of the flash memory 130; otherwise, the memory management unit 110b writes the data into both the lower pages and the upper pages of the flash memory 130.

Moreover, in another exemplary embodiment of the present invention, if the pattern identification unit 110e identifies that the data belongs to the frequent update pattern, the memory management unit 110b writes the data in the random writing mode; otherwise, the memory management unit 110b writes the data through the steps illustrated in FIGS. 2B and 2C. In yet another embodiment of the present invention, if the pattern identification unit 110e identifies that the data belongs to a discontinuous storage pattern, the memory management unit 110b writes the data into the buffer storage area 120 or into the physical block in the random writing mode.

Figure 3A:
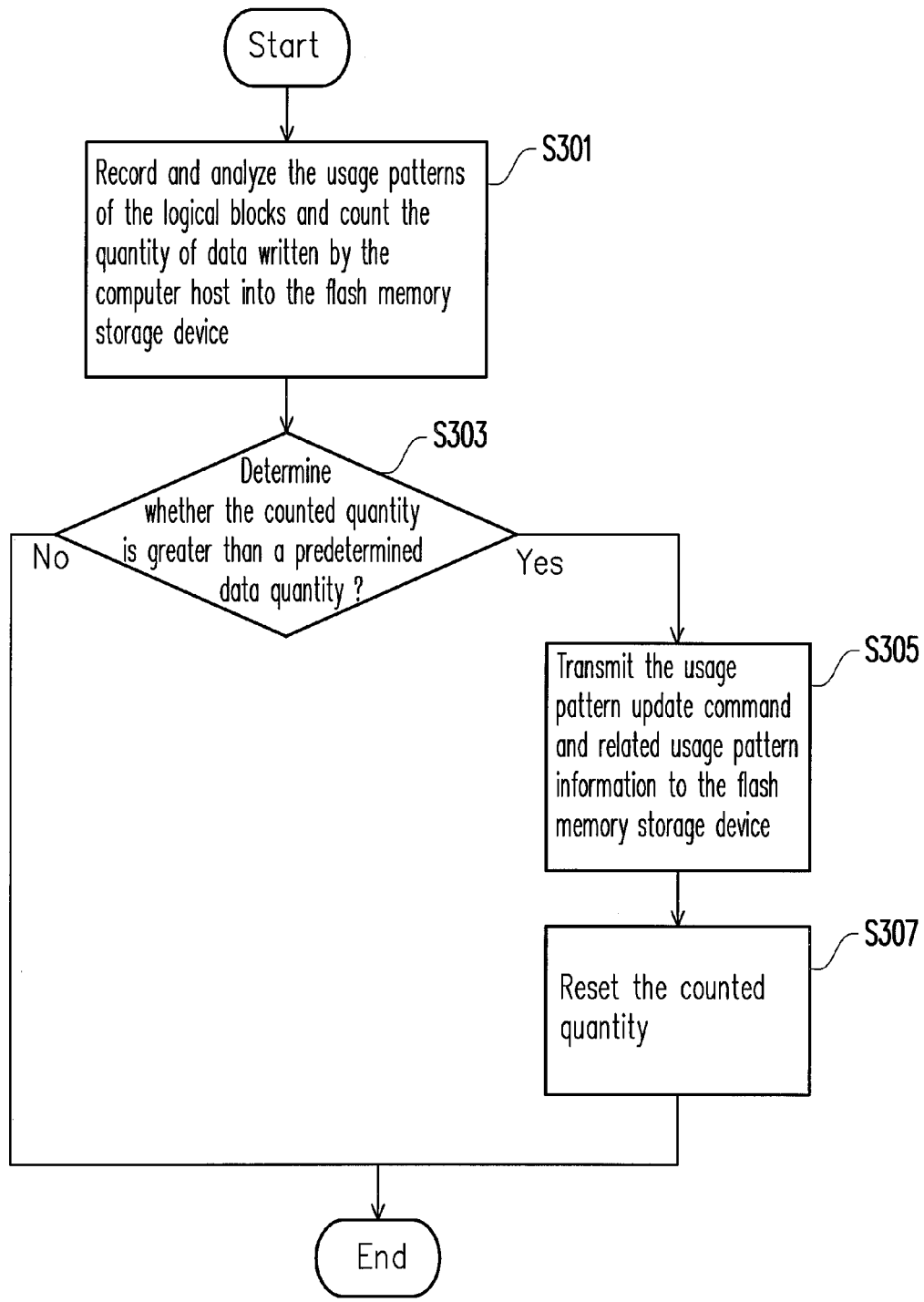
FIG. 3A is a flowchart illustrating how a usage pattern is recorded and transmitted according to the first exemplary embodiment of the present invention.

FIG. 3A is a flowchart illustrating how a usage pattern is recorded and transmitted according to the first exemplary embodiment of the present invention.

Referring to FIG. 3A, when the computer host 200 writes data into the flash memory storage device 100, in step S301, the pattern analysis unit 150 records and analyzes the usage patterns of the logical blocks and counts the quantity of data written by the computer host 200 into the flash memory storage device 100. After that, in step S303, the pattern analysis unit 150 determines whether the counted quantity is more than a predetermined data quantity. If the counted quantity is more than the predetermined data quantity, in step S305, the pattern analysis unit 150 transmits the usage pattern update command and related usage pattern information to the flash memory storage device 100. Finally, in step S307, the counted quantity is reset (for example, to zero).

It should be understood that the present invention is not limited to foregoing description, and in another embodiment of the present invention, the pattern analysis unit 150 transmits the analyzed information to the flash memory storage device 100 at a predetermined interval. For example, the pattern analysis unit 150 can be set to transmit the analyzed information to the flash memory storage device 100 at every 30 seconds.

In the present exemplary embodiment, if the pattern identification unit 110e identifies that the logical block for writing a data belongs to the frequent update pattern, the memory management unit 110b temporarily stores the data into the buffer storage area 120. In addition, if the pattern identification unit 110e identifies that the logical block for writing the data belongs to the continuous storage pattern, the memory management unit 110b executes the processes for opening and closing mother-child blocks (as shown in FIG. 2C) to write data into the corresponding physical block.

Figure 3B:
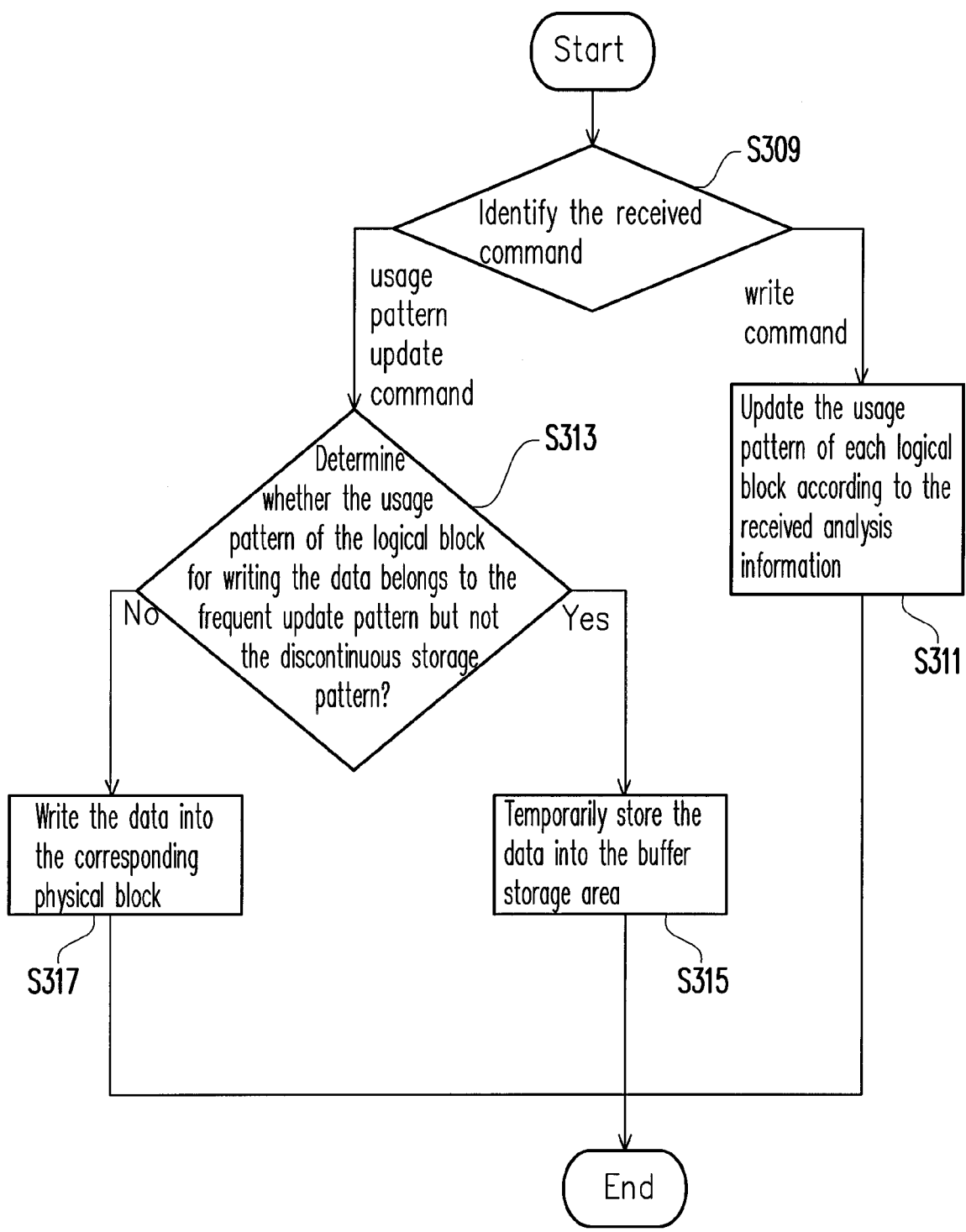
FIG. 3B is a flowchart illustrating how a flash memory storage device executes a write command and a usage pattern update command according to the first exemplary embodiment of the present invention.

FIG. 3B is a flowchart illustrating how a flash memory storage device executes a write command and a usage pattern update command according to the first exemplary embodiment of the present invention. It should be understood that in the present exemplary embodiment, even though only the steps of the flash memory storage device 100 processing the write command and usage pattern update command are illustrated, the flash memory storage device 100 can also receive and execute other commands (for example, erase commands and read commands).

Referring to FIG. 3B, when the flash memory storage device 100 is connected to the computer host 200 and receives a command from the computer host 200, in step S309, the flash memory controller 110 identifies the received command. If the received command is a usage pattern update command, in step S311, the pattern identification unit 110e updates the usage pattern of each logical block according to the received analysis information.

If the received command is a write command, in step S313, the memory management unit 110b determines whether the usage pattern of the logical block for writing the data belongs to the frequent update pattern but not the discontinuous storage pattern. If the usage pattern of the logical block for writing the data belongs to the frequent update pattern but not the continuous storage pattern, in step S315, the memory management unit 110b temporarily stores the data into the buffer storage area 120; otherwise, in step S317, the memory management unit 110b writes the data into the corresponding physical block.

Second Exemplary Embodiment

Figure 4:
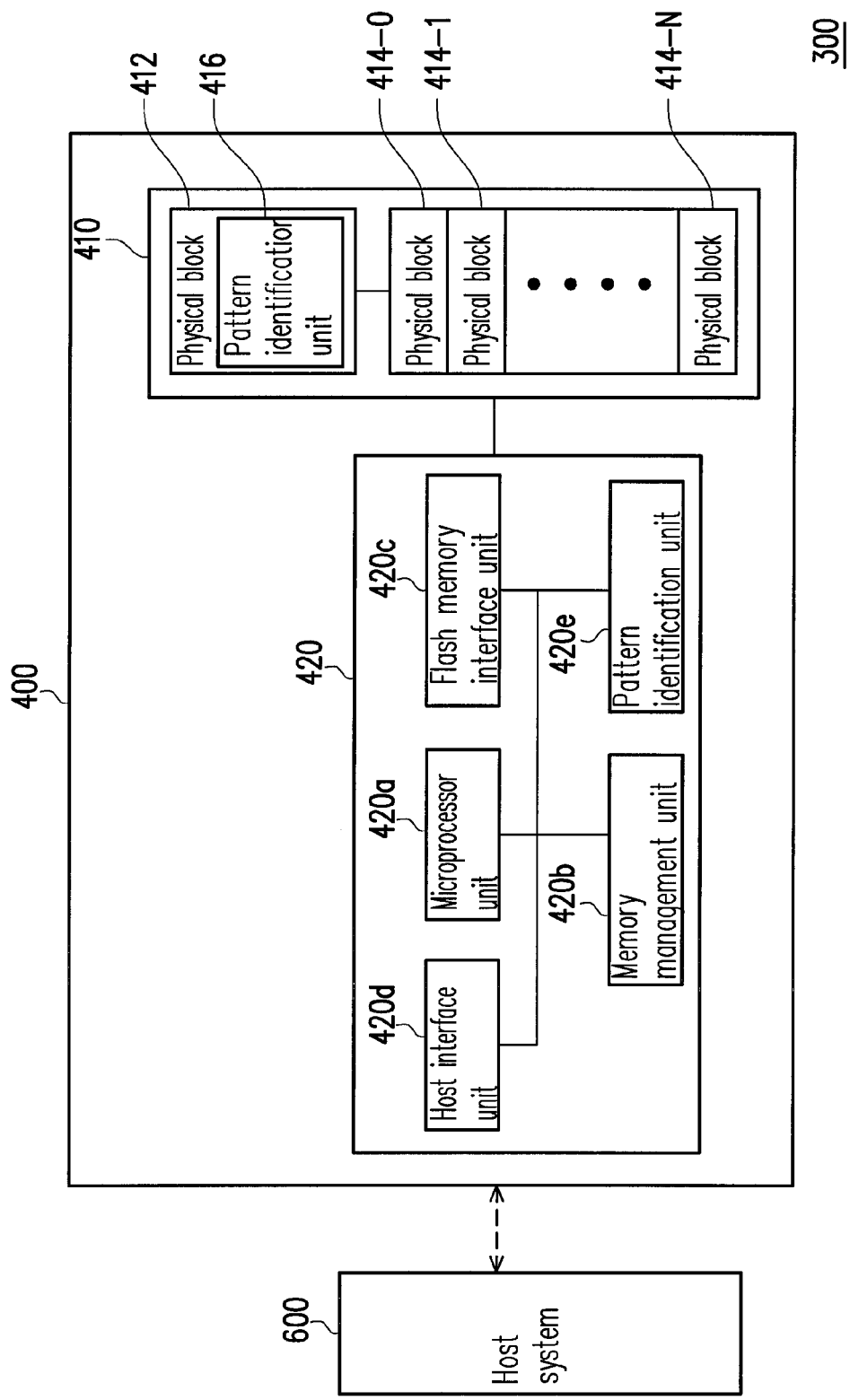
FIG. 4 illustrates a data storage system according to a second exemplary embodiment of the present invention.

FIG. 4 illustrates a data storage system according to the second exemplary embodiment of the present invention.

Referring to FIG. 4, the data storage system 400 includes a flash memory module 410 and a flash memory controller 420.

The data storage system 400 is detachable connected to a host system 600 so that the host system 600 can write data into or read data from the data storage system 400. In the present exemplary embodiment, the data storage system 400 is a solid state drive (SSD). However, the data storage system 400 may also be a memory card or a flash drive in another embodiment of the present invention.

The flash memory module 410 includes a control circuit 412 and physical blocks 414-0~414-N.

The control circuit 412 transmits data to the physical blocks 414-0~414-N or reads data from the physical blocks 414-0~414-N according to instructions of the flash memory controller 420. In the present exemplary embodiment, the control circuit 412 encodes the data to be written into the physical blocks 414-0~414-N or decodes the data read from the physical blocks 414-0~414-N. It should be mentioned that the encoding operation is performed because errors may be caused if adjacent memory cells in a flash memory are programmed into the same voltage level. Thereby, the stability of the data storage system 400 can be improved by encoding the data to be written based on a special encoding rule before the data is written.

In particular, the control circuit 412 can execute different encoding rules. For example, the control circuit 412 can reverse each bit in the input data (i.e., change "0" to "1" or "1" to "0") or divide the input data into multiple sub-data and exchange the positions of these sub-data.

The structure and operations of the physical blocks 414-0~414-N are the same as those of the physical blocks 130-0~130-N in the first exemplary embodiment therefore will not be described herein.

The flash memory controller 420 executes a plurality of logic gates or control instructions implemented as hardware or firmware and accesses data in the flash memory module 410 according to instructions of the host system 600.

The flash memory controller 420 includes a microprocessor unit 420a, a memory management unit 420b, a flash memory interface unit 420c, a host interface unit 420d, and a pattern analysis unit 420e.

The structures and functions of the microprocessor unit 420a, the flash memory interface unit 420c, and the host interface unit 420d are the same as those of the microprocessor unit 110a, the flash memory interface unit 110c, and the host interface unit 110d in the first exemplary embodiment therefore will not be described herein.

The memory management unit 420b is coupled to the microprocessor unit 420a and performs various data accessing operations to the physical blocks 414-0~414-N according to the block management mechanism and data writing mechanism in the present exemplary embodiment. For example, the memory management unit 420b executes the operations illustrated in FIGS. 2A~2C. Similar to the memory management unit 110b in the first exemplary embodiment, the memory management unit 420b is also implemented as a firmware. However, the memory management unit 420b may also be implemented as software or hardware.

The pattern analysis unit 420e is coupled to the microprocessor unit 420a and analyzes a data sequence pattern of the data to be written by the memory management unit 420b into the flash memory module 410. In addition, the pattern analysis unit 420e transmits the analysis information to the control circuit 412 through a data pattern command. To be specific, in the present exemplary embodiment, the control circuit 412 has a pattern identification unit 416 for receiving and identifying a usage pattern (i.e., foregoing analysis information) from the pattern analysis unit 420e.

Particularly, in the present exemplary embodiment, the control circuit 412 first encodes the data to be written based on one of the encoding rules according to the identification result of the pattern identification unit 416 and then transmits the encoded data to the physical blocks 414-0~414-N.

In another exemplary embodiment of the present invention, the flash memory controller 420 further includes an error correction unit (not shown) which executes an error correction process, and the pattern analysis unit 420e records a usage pattern of whether any bit error occurs or the number of bit errors for each of the physical blocks 414-0~414-N according to the execution result of the error correction unit. Similarly, the pattern analysis unit 420e transmits the analysis information to the pattern identification unit 416.

Figure 5:
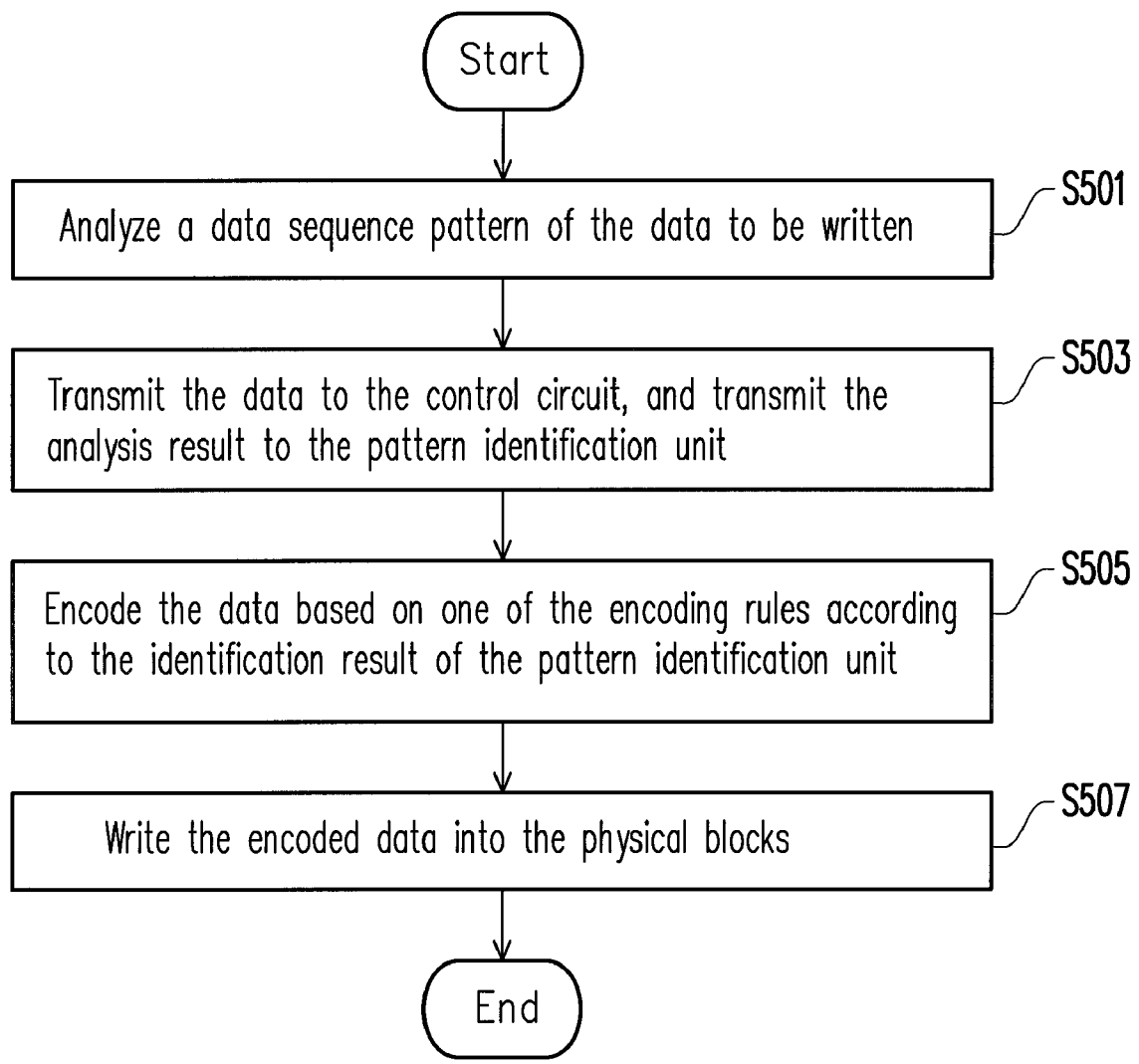
FIG. 5 is a flowchart of a data storage method according to the second exemplary embodiment of the present invention.

FIG. 5 is a flowchart of a data storage method according to the second exemplary embodiment of the present invention. It should be understood that even though only the steps of the data storage system 400 processing a write command are illustrated in FIG. 5, the data storage system 400 can also receive and execute other commands (for example, an erase command or a read command).

Referring to FIG. 5, when the data storage system 400 is connected to the host system 600 and receives a write command and data to be written from the host system 600, in step S501, the pattern analysis unit 420e of the flash memory controller 420 analyzes a data sequence pattern of the data. In step S503, the memory management unit 420b transmits the data to the control circuit 412, and the pattern analysis unit 420e transmits the analysis result to the pattern identification unit 416.

Thereafter, in step S505, the control circuit 412 encodes the data based on one of the encoding rules according to the identification result of the pattern identification unit 416.

Finally, in step S507, the control circuit 412 writes the encoded data into the physical blocks 414-0~414-N.

It should be understood that because the data written into the physical blocks 414-0~414-N is encoded, when the host system 600 reads data from the data storage system 400, the control circuit 412 has to decode the data according to the corresponding encoding rule so that the flash memory controller 420 can transmit the correct data to the host system 600.

As described above, in the present invention, a pattern analysis unit is provided such that the usage patterns of flash memory storage addresses and the data to be written can be analyzed in the data storage system, and a pattern identification unit is also provided such that the data can be stored through a corresponding process according to foregoing analysis information. Thereby, the previously described exemplary embodiments of the present invention have many advantages, including to effectively improve the storing speed of the storage system and to effectively prolong the lifespan of the storage system, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data storage method, comprising:
providing a storage device, wherein the storage device has a control circuit and a plurality of flash memory storage addresses of at least part of a flash memory module;
providing a pattern analysis unit, wherein the pattern analysis unit is controlled by a host;
disposing a pattern identification unit in the control circuit;
recording a usage pattern of each the flash memory storage address by using the pattern analysis unit;
receiving information from the pattern analysis unit through the pattern identification unit to identify the usage patterns of the flash memory storage addresses; and
storing data into the flash memory storage addresses according to the usage pattern of the flash memory storage addresses.

2. The data storage method according to claim 1, wherein the storage device is a flash memory storage device having the flash memory module, the host is a computer system, and the flash memory storage addresses are mapped to a plurality of logical blocks, wherein the flash memory module has a plurality of physical blocks, and each of the logical blocks is mapped to at least one of the physical blocks and the step of recording the usage pattern of each of the flash memory storage addresses by using the pattern analysis unit comprises:
recording whether each of the logical blocks belongs to a frequent update pattern by using the pattern analysis unit.

3. The data storage method according to claim 2, wherein the step of recording whether each of the logical blocks belongs to the frequent update pattern by using the pattern analysis unit comprises:
identifying each of the logical blocks storing a file system table as the frequent update pattern.

4. The data storage method according to claim 2, wherein the step of recording whether each of the logical blocks belongs to the frequent update pattern by using the pattern analysis unit comprises:
identifying each of the logical blocks which has a write number more than a write number threshold as the frequent update pattern.

5. The data storage method according to claim 2, wherein the flash memory storage device has a buffer storage area, and the step of storing the data into each of the flash memory storage addresses according to the usage pattern of the flash memory storage address comprises:
temporarily storing the data into the buffer storage area if the logical blocks for writing the data belong to the frequent update pattern.

6. The data storage method according to claim 2, wherein the physical blocks have a plurality of lower pages and a plurality of upper pages, and the step of storing the data into each of the flash memory storage addresses according to the usage pattern of the flash memory storage address comprises:
writing the data into only the lower pages if the logical blocks for writing the data belong to the frequent update pattern.

7. The data storage method according to claim 2, wherein the step of storing the data into each of the flash memory storage addresses according to the usage pattern of the flash memory storage address comprises:
writing the data into the physical blocks without copying valid old data corresponding to the data first if the logical blocks for writing the data belong to the frequent update pattern.

8. The data storage method according to claim 1, wherein the storage device is a flash memory storage device having the flash memory module, the host is a computer system, and the flash memory storage addresses are mapped to a plurality of logical blocks, wherein the flash memory module has a plurality of physical blocks, and each of the logical blocks is mapped to at least one of the physical blocks and the step of recording the usage pattern of each of the flash memory storage addresses by using the pattern analysis unit comprises:
recording whether each of the logical blocks belongs to a continuous storage pattern by using the pattern analysis unit.

9. The data storage method according to claim 8, wherein the step of recording whether each of the logical blocks belongs to the continuous storage pattern by using the pattern analysis unit comprises:
if the number of writing data having a first size into a corresponding logical block among the logical blocks is more than the number of writing data having a second size into the corresponding logical block, identifying the corresponding logical block as the continuous storage pattern, wherein the first size is bigger than the second size.

10. The data storage method according to claim 8, wherein the step of recording whether each of the logical blocks belongs to the continuous storage pattern by using the pattern analysis unit comprises:
if a length of the data written into a corresponding logical block among the logical blocks is more than a data quantity threshold, identifying the corresponding logical block as the continuous storage pattern.

11. The data storage method according to claim 8, wherein the step of storing the data into each of the flash memory storage addresses according to the usage pattern of the flash memory storage address comprises:

if the logical blocks for writing the data belong to the continuous storage pattern, directly writing the data into the physical blocks corresponding to the logical blocks for writing the data.

12. The data storage method according to claim 8, wherein the flash memory storage device has a buffer storage area, and the step of storing the data into each of the flash memory storage addresses according to the usage pattern of the flash memory storage address comprises:

if the logical blocks for writing the data do not belong to the continuous storage pattern, writing the data into the buffer storage area or into the physical blocks without copying valid old data corresponding to the data first.

13. The data storage method according to claim 12, wherein the storage device is the flash memory module, the host is a flash memory controller, and the flash memory storage addresses are mapped to a plurality of physical blocks and the step of recording the usage pattern of each of the flash memory storage addresses by using the pattern analysis unit comprises:

recording a data sequence pattern of the data by using the pattern analysis unit.

14. The data storage method according to claim 13, wherein the step of storing the data into each of the flash memory storage addresses according to the usage pattern of the flash memory storage address comprises:

encoding the data according to the data sequence pattern of the data, and writing the encoded data into the physical blocks.

15. A data storage system, comprising:
a host;
a storage device, coupled to the host, having a control circuit and a plurality of flash memory storage addresses of at least part of a flash memory module, wherein the control circuit has a pattern identification unit; and
a pattern analysis unit, controlled by the host, for recording a usage pattern of each of the flash memory storage addresses,
wherein the pattern identification unit receives information from the pattern analysis unit to identify the usage pattern of each of the flash memory storage addresses, and the control circuit stores data into each of the flash memory storage addresses according to the usage pattern of the flash memory storage address.

16. The data storage system according to claim 15, wherein the storage device is a flash memory storage device having the flash memory module, the control circuit is a flash memory controller, the host is a computer system, and the flash memory storage addresses are mapped to a plurality of logical blocks,
wherein the flash memory module has a plurality of physical blocks, and each of the logical blocks is mapped to at least one of the physical blocks.

17. The data storage system according to claim 16, wherein the pattern analysis unit records whether each of the logical blocks belongs to a frequent update pattern as the usage pattern of the logical block.

18. The data storage system according to claim 17, wherein the pattern analysis unit identifies the logical blocks storing a file system table as the frequent update pattern.

19. The data storage system according to claim 17, wherein if a write number of a corresponding logical block among the logical blocks is more than a write number threshold, the pattern analysis unit identifies the corresponding logical block as the frequent update pattern.

20. The data storage system according to claim 17, wherein the flash memory storage device has a buffer storage area,
wherein when the pattern identification unit identifies the logical blocks for writing the data belong to the frequent update pattern, the flash memory controller temporarily stores the data into the buffer storage area, wherein the buffer storage area comprises a dynamic random access memory (DRAM) or a flash memory temporary area, wherein the flash memory temporary area comprises at least one of the physical blocks.

21. The data storage system according to claim 17, wherein the physical blocks have a plurality of lower pages and a plurality of upper pages,
wherein when the pattern identification unit identifies the logical blocks for writing the data belong to the frequent update pattern, the flash memory controller writes the data into only the lower pages.

22. The data storage system according to claim 17, wherein when the logical blocks for writing the data belong to the frequent update pattern, the flash memory controller writes the data into the physical blocks in a random writing mode.

23. The data storage system according to claim 16, wherein the pattern analysis unit records whether each of the logical blocks belongs to a continuous storage pattern as the usage pattern of the logical block, wherein if the number of writing data having a first size into a corresponding logical block among the logical blocks is more than the number of writing data having a second size into the corresponding logical block, the pattern analysis unit identifies the corresponding logical block as the continuous storage pattern, or if a length of the data written into a corresponding logical block among the logical blocks is more than a data quantity threshold, the pattern analysis unit identifies the corresponding logical blocks as the continuous storage pattern,
wherein the first size is bigger than the second size.

24. A data arrangement method adapted to transfer data to a flash memory module having a plurality of flash memory storage addresses, comprising:
providing a control circuit;
disposing a pattern identification unit in the control circuit;
receiving information from a pattern analysis unit controlled by a host through the pattern identification unit to identify a usage patterns of the flash memory storage addresses recorded by the pattern analysis unit; and
storing data into the flash memory storage addresses according to the usage pattern of the flash memory storage addresses.

25. An apparatus adapted to transfer data to a detachable flash memory storage having a plurality of flash memory storage addresses of at least part of a flash memory module, comprising:
a processor; and
a pattern analysis unit, coupled to the processor, for recording a usage pattern of each of the flash memory storage addresses,
wherein the pattern analysis unit records whether each of the logical blocks belongs to a frequent update pattern as the usage pattern of the logical block.

* * * * *